United States Patent
Handy et al.

(10) Patent No.: US 9,968,971 B1
(45) Date of Patent: May 15, 2018

(54) FRICTION WASHER THAT CLEANS PLASTIC FOR RECYCLING

(71) Applicant: PLASTIC REVOLUTIONS, INC., Reidsville, NC (US)

(72) Inventors: Ed Handy, Reidsville, NC (US); John Hagan, Reidsville, NC (US); Mike Collins, Reidsville, NC (US)

(73) Assignee: Plastic Revolutions, Inc., Reidsville, NC (US)

(*) Notice: Subject to any disclaimer, the term of this patent is extended or adjusted under 35 U.S.C. 154(b) by 147 days.

(21) Appl. No.: 14/329,345

(22) Filed: Jul. 11, 2014

(51) Int. Cl.
*B08B 3/04* (2006.01)
*B08B 3/14* (2006.01)

(52) U.S. Cl.
CPC .............. *B08B 3/044* (2013.01); *B08B 3/14* (2013.01)

(58) Field of Classification Search
CPC .... B08B 3/042; B08B 1/04; B30B 9/12–9/18; B65G 49/0422; Y02W 30/62; Y02W 30/622; B29B 17/02
USPC ................................................ 209/293, 294
See application file for complete search history.

(56) References Cited

U.S. PATENT DOCUMENTS

| | | | | |
|---|---|---|---|---|
| 3,323,647 A * | 6/1967 | Ogden | .................... | B23K 9/324 209/223.1 |
| 4,266,473 A * | 5/1981 | Hunt | ........................ | B30B 9/12 100/117 |
| 5,390,799 A * | 2/1995 | Previero | .................... | B03B 1/04 209/3 |
| 5,458,245 A * | 10/1995 | Heckel | .................... | B07B 11/06 209/139.1 |
| 6,206,199 B1 * | 3/2001 | Kurtz | ........................ | B02C 7/06 209/11 |
| 2002/0062844 A1 * | 5/2002 | Imai | .................... | B02C 18/0076 134/18 |
| 2002/0153285 A1 * | 10/2002 | Arakane | ................. | B03B 9/061 209/3 |
| 2003/0094188 A1 * | 5/2003 | Urabe | .................... | B29B 17/02 134/132 |
| 2010/0200173 A1 * | 8/2010 | Furukawa | ............... | B29B 17/02 156/762 |
| 2011/0245457 A1 | 10/2011 | Rougelot et al. | ............. | 528/486 |
| 2014/0131491 A1 | 5/2014 | Kulesa et al. | .................. | 241/42 |

OTHER PUBLICATIONS

Information Sheet 46, Herbold Friction Washer series FA, Sep. 2013.
"Friction Washer—Plastic Recycling Machine," www.plasticrecyclingmachine.net/friction-washer; copyright 2013.
Friction Washer, FW Series, Panchal Plastic Machinery Pvt. Ltd, information sheet; undated, admitted prior art.

* cited by examiner

*Primary Examiner* — Marc Lorenzi
(74) *Attorney, Agent, or Firm* — MacCord Mason PLLC

(57) ABSTRACT

A method of cleaning plastic chips includes introducing a mixture of plastic chips and water to an in-feed of a housing. The mixture of plastic chips and water is impelled from the in-feed within the housing and agitated so that debris on the plastic chips is abraded by adjacent chips and agitators until substantially all debris has been removed from the plastic chips. Water and debris are discharged through a screen to a debris discharge. Cleaned plastic chips are discharged to a plastic chip discharge that is further from the in-feed than the debris discharge. Chip discharge takes place when the pressure of the plastic chips at the plastic chip discharge exceeds a threshold.

11 Claims, 8 Drawing Sheets

FRICTION WASHER THAT CLEANS PLASTIC FOR RECYCLING

BACKGROUND OF THE INVENTION

The present invention relates to an improved friction washer, particularly for use in connection with cleaning plastic chips in a plastic recycling operation. Since the beginning of the environmental movement, recycling has been an important aspect of environmental protection, reducing the need for landfill use. Plastic items, particularly plastic bottles of high density polyethylene or HDPE are commonly used for many household products, such as detergents, dishwashing liquids, and the like. In the recycling process, the various plastics are separated by their polymer type and then chopped into small pieces, referred to herein as plastic chips. The pieces typically are no smaller than ⅛ of an inch in diameter. The chips continue to have residues of their prior use, particularly paper labels, adhesives for paper labels, and ingredients of the vessels which they made up. For the plastic itself to be reused, these debris contaminants needs to be removed.

Friction washers are known which require wash water and the plastic chips to travel uphill, with the water and debris discharging at a downhill location, with the cleaned chips discharging at an uphill location. Prior art devices have left excessive amounts of debris on the plastic chips, even after a large volume of hot water (160 degrees Fahrenheit) has been applied to them and an exorbitant amount of electric power has been consumed to agitate them.

Large volumes of water are particularly undesirable because the water is a contaminant and must be dealt with as a potential hazardous waste and processed to remove contaminants from the water. Heating the water is also undesirable, because of the added energy costs involved.

SUMMARY OF THE INVENTION

The present invention fulfills one or more of these needs in the art by providing a friction washer for removing debris from plastic chips. The washer includes an elongated hollow housing having a rounded cross section mounted substantially horizontally and having a top and a bottom. An in-feed port in an in-feed end of the top can connect to an in-feed conduit for supplying plastic chips and water into the housing. A plastic chip discharge port is located in a discharge end at the bottom of the housing. The plastic chip discharge port is a force-modulated discharge port held closed by a force to maintain the plastic chip discharge port closed until a plastic chip load within the housing overcomes the force to open the plastic chip discharge port. A debris discharge port covered with a mesh is positioned between the in-feed end and the discharge end to discharge water and debris removed from the plastic chips. A rotor is mounted for rotation within the housing and has multiple series of blades extending outward from the rotor within the hollow housing and a screw flight at an in-feed end of the rotor. A motor drives the rotor and screw flight, powered by a power supply to the motor. The water and plastic chips are introduced into the in-feed and moved toward the discharge by the screw flight until encountering the rotor and its blades, whereupon the plastic chips are agitated against one another, the water, the inside of the housing and the rotor and its blades, so that debris is frictionally removed from the plastic chips as they pass from the in-feed end toward the discharge end. The debris and water can pass through the mesh to exit the debris discharge port. The cleaned plastic chips continue toward the plastic chip discharge port, where, when the pressure within the housing is great enough to overcome the weight on the closure, the closure opens to discharge cleaned plastic chips, and then recloses if the pressure with the housing falls enough to no longer overcome the force on the closure.

The water and plastic chips are preferably fed to the housing at ratio of about 20 gallons of water to about 6000 pounds of plastic chips. The in-feed conduit to the in-feed port may introduce unheated water.

In one embodiment, the force-modulated plastic chip discharge port has a counterweight closure to maintain the force-modulated plastic chip discharge port closed until a plastic chip load within the housing overcomes the counterweight to open the plastic chip discharge port. The counterweighted closure may include a pivotally mounted lever with a closure plate on the lever on one side of a pivot mount and a weight on an opposite side of the pivot mount, the weight being adjustably positioned on the lever to allow adjustment of the force acting to maintain the plastic chip discharge port closed.

The blades on the rotor desirably have staggered positions from one series of blades to an adjacent series. The rotor typically has an axis and the blades are flat areas, with the flat areas of the blades being substantially entirely parallel with the axis of the rotor. The rotor may have blade mounts and the blades that are replaceably mounted in the blade mounts. The housing preferably has a series of blades extending downward within the hollow housing from the top of the housing.

The motor may be an electric motor and the power supply may be an electric power supply that supplies 60 amps of current to the motor as the rotor turns in the range of 550-650 RPM and the plastic chip load is maintained at a high enough level to maintain a plastic chip residence time in the housing long enough to be cleaned.

The invention can also be considered as a method of cleaning plastic chips including introducing a mixture of plastic chips and water to an in-feed of a housing, impelling the mixture of plastic chips and water from the in-feed within the housing and agitating the mixture so that debris on the plastic chips is abraded by adjacent chips and agitators until substantially all debris has been removed from the plastic chips. Water and debris are discharged through a screen to a debris discharge, and plastic chips are discharged through a plastic chip discharge that is further from the in-feed than the debris discharge. Plastic chip discharge takes place when the pressure of the plastic chips at the plastic chip discharge in the housing exceeds a threshold.

Preferably, the threshold that needs to be exceeded to discharge plastic chips from the plastic chip discharge is adjustable. Adjusting the threshold may include changing the position of a counterweight to a closure for the plastic chip discharge.

Impelling the mixture may include driving a screw flight with an electric motor with 60 amps of current to turn the screw flight in the range of 550-650 RPM as the plastic chip load is maintained at a high enough level to maintain a plastic chip residence time in the housing long enough to be cleaned.

Introducing water may include introducing unheated water or room temperature water. Impelling the mixture of plastic chips and water and agitating the mixture may include driving a rotor having a screw flight and flat blades that are substantially entirely parallel with the axis of the rotor on a common shaft.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
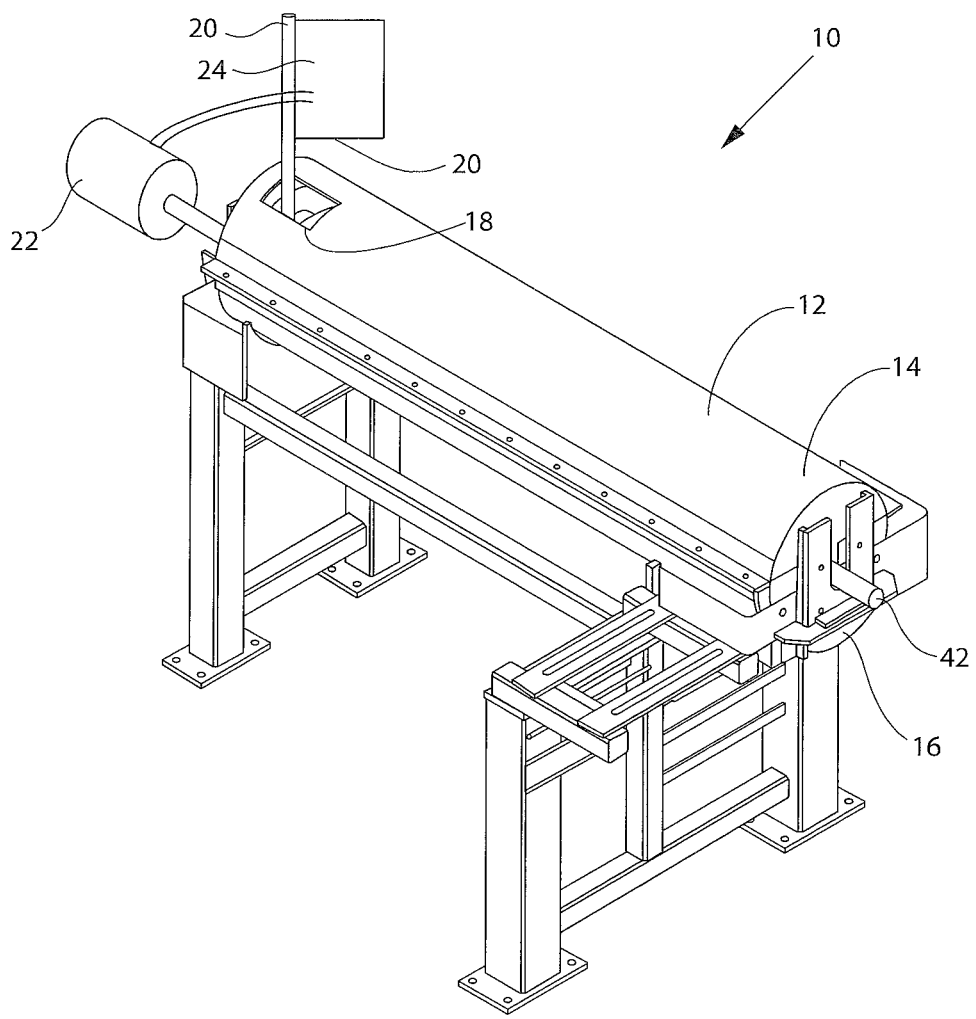
FIG. 1 is a perspective top view of a housing, plastic chip in-feed, drive motor and power supply.
Figure 6:
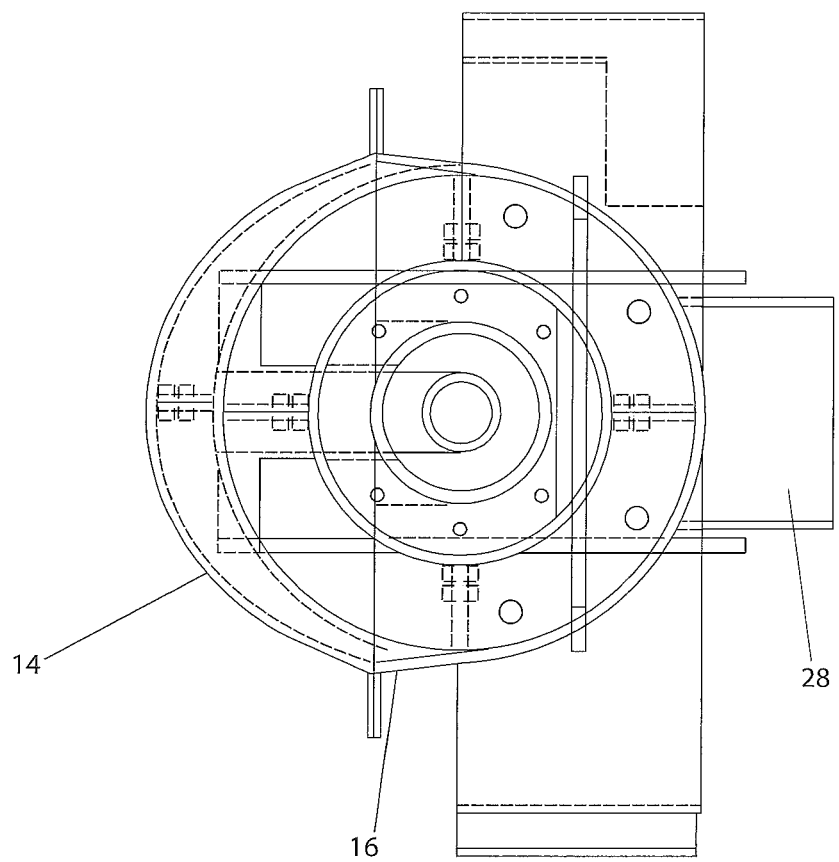
FIG. 6 is a sectional view of the embodiment of FIG. 5 taken along lines 6-6 and looking in the direction of the arrows.

As seen in FIG. 1, an embodiment of the invention can be seen generally, including a housing 12 made up of a top component 14 and a bottom component 16. The two components together make up a cylinder with an oval cross section. The housing 12 is mounted substantially horizontally on the base support as shown. Other support designs can be used. See FIG. 6 for a cross sectional view showing that the cylinder is somewhat bowed upwardly toward the top 14. The housing 12 is provided with an in-feed for plastic chips and water supplied through piping such as piping 20. A rotor within the housing 12 is driven by a motor 22 which in turn is supplied with electricity by electrical power supply 24. Other types of motors such as hydraulic could also be used.

Figure 2:
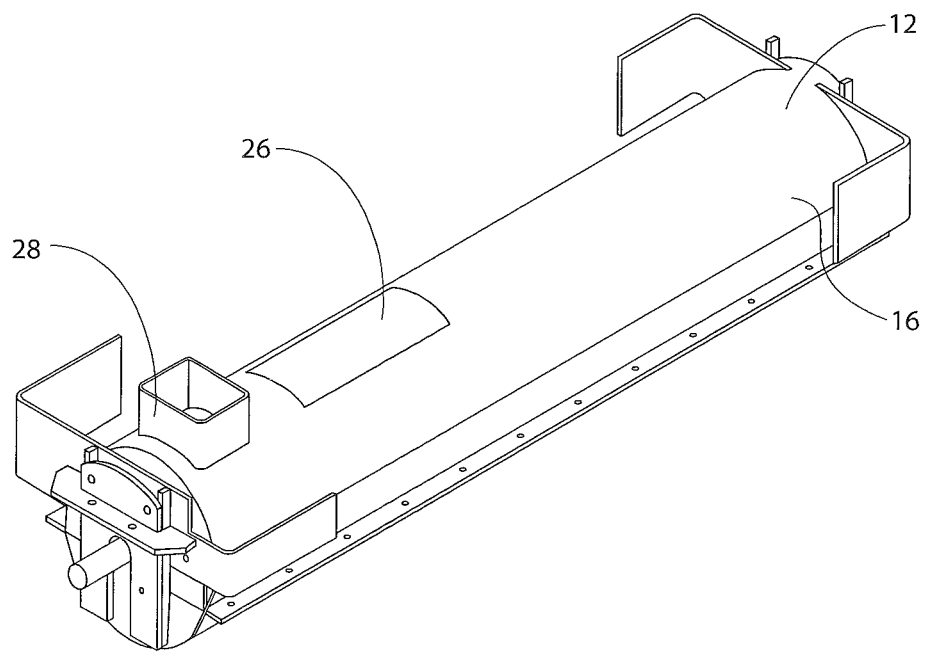
FIG. 2 is a perspective bottom view of the housing.

FIG. 2 shows a bottom view of the housing 12 including the bottom shell component 16. The bottom shell component 16 is provided with a mesh covered discharge 26 for discharging water and debris which has been removed from the plastic chips. Further toward a discharge end of the housing 12 is a plastic chip discharge port 28.

Figure 3:
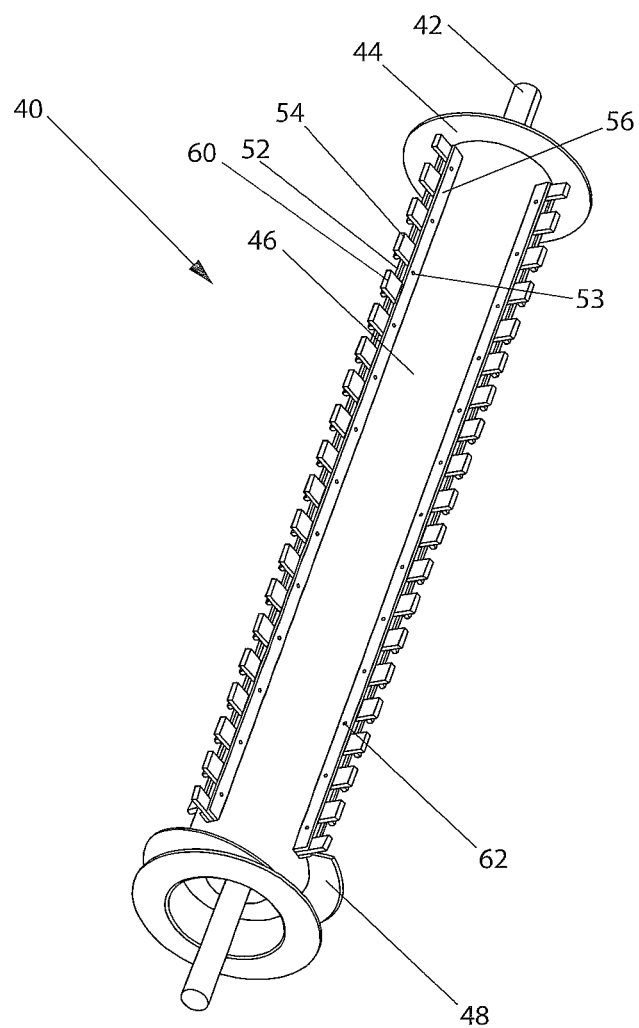
FIG. 3 is a perspective view of the rotor, showing the screw flight and two of the blades.

As mentioned, a rotor is disposed within the housing and an embodiment of that rotor is seen in FIG. 3. The drive shaft 42 has flanges 44 mounted on either end spaced apart by a rotor that includes a screw flight 48 and a hub 46. A helical screw flight 48 is provided at the in-feed end of the rotor. One flight is sufficient, but more can be provided. The flight is oriented in connection with the direction of rotation so that infeeding water and plastic chips are impelled toward the discharge port and outfeed end. Blades 50 are arrayed along the hub 46 of the rotor. Each blade will be subject to considerable wear, so they are preferably made to be easily accessible and replaceable. A blade plate 54 is seen alone in FIG. 7. The blade plate 54 is made up of a series of spaced apart teeth 60.

Figure 4:
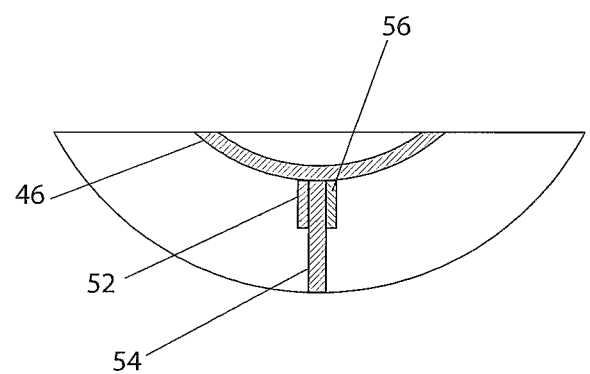
FIG. 4 is a sectional view of the rotor showing the mounting of one of the blades
Figure 7:
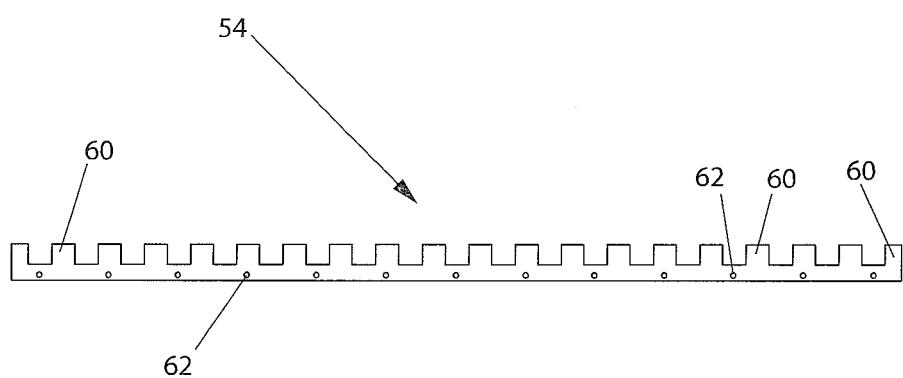
FIG. 7 is a view of one of the replaceable blades.

As seen in the sectional view in FIG. 4, blade plate 54 slips between two flanges 52 and 56. The blade plate 54 can be secured in place between the flanges 52 and 56 by screws 53 in corresponding screw holes 62, as seen in FIG. 7. Preferably, as seen in FIG. 3, there are multiple sets of the blades, and the embodiment shown in FIG. 3, the hub is provided with a series of four blades, 90 degrees apart. Preferably, the teeth 60 of each blade 54 are offset longitudinally from the teeth 60 of the next adjacent blade plate 54. As the teeth are rotated through the plastic chips and water, the offset teeth expose the plastic chips and water to varying agitations, so the chips slide across frictional surfaces many times.

Figure 5:
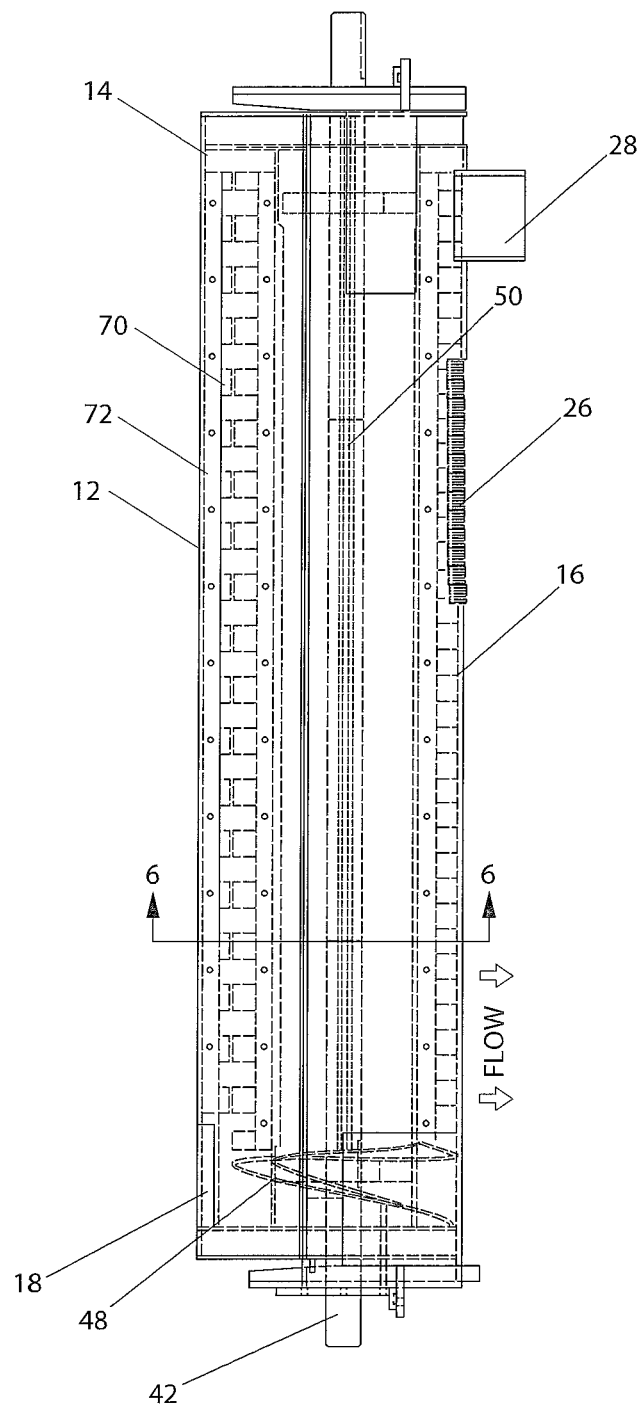
FIG. 5 is a longitudinal, sectional view through the housing and rotor showing the respective positioning of the screw flight and blades.

As seen in FIG. 5, the housing 12 also has a set of teeth on a blade plate 70 depending from the top of the housing 14. These teeth can be constructed like the teeth of the rotor, with flanges 72 holding blade plate 70 in place. As can be seen in FIG. 5, the infeed 18 is positioned above the screw flight 48 so that the incoming plastic chips and water are immediately subjected to the motive force of the screw flight. The plastic chips and water that are thus impelled by the screw flight are forced against already-moved plastic chips and water throughout the housing 12. As the blades pass around and through that mixture of plastic chips and water, the plastic chips, water and metal parts of the blades and housing and rub against one another, causing abrasive forces to remove debris from the plastic chips. The plastic chips, water and removed debris also move from the in-feed end 18 toward the discharge port 28. As they pass over the mesh screen 26, water and debris are allowed to fall out to be dealt with separately. The mesh is fine enough to prevent the plastic chips, which are typically larger than ⅛" diameter, from falling out of the mesh screen 26. Once the plastic chips reach the plastic chip discharge port 28, they are substantially free of debris and water. At the discharge port 28, the plastic chips accumulate and build up pressure within the housing 12.

Figure 8:
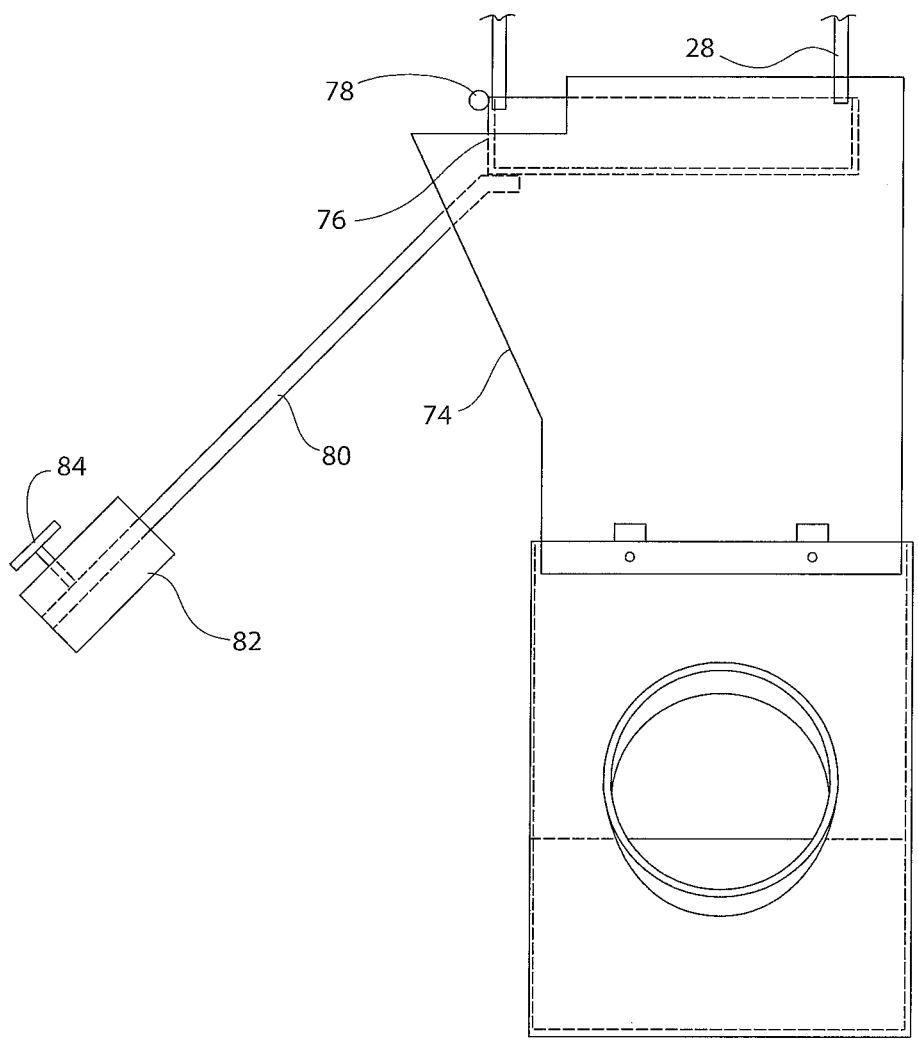
FIG. 8 is a schematic view of the closure for the plastic chip discharge port.

The plastic chips are prevented from exiting the discharge port 28 by a closure cup 76 seen in FIG. 8. The closure cup 76 is pivotally mounted at 78 to the discharge port 28. An extension arm 80 extends laterally from the closure cup 76 in an elongated fashion and a weight 82 with an internal bore can be selectively positioned on the extension arm 80. A set screw 84 in the weight 82 allows the positioning of the weight 82 on the arm 80 to be maintained as desired. As a result, the weight 82 provides a levered closure force on the closure cup 76, forming a closure for the discharge port 28. When the force within the housing 12 exceeds the force exerted upwardly on the closure cup 76, the closure cup 76 can pivot downwardly, discharging cleaned plastic chips into a discharge chute 74 for further processing. When the pressure in the housing is reduced, the closure cup 76 re-closes the port 28.

Referring again to FIG. 1, the drive motor 22 may be a 100 HP motor and preferably rotates the shaft 22 at 550 to 650 rpm, and more preferably at 600 rpm. The power supply 24 supplies power to the motor 22 to effect this result, drawing a mere 60 amperes of 120 volt electricity to achieve satisfactory results. The positioning of the weight 82 on the arm 80 is selected to cause the plastic chips within the housing to stay exposed to continued agitation for a long enough period to come out adequately cleaned. That period can vary over time, particularly as the metal components of the housing and rotor become worn. Adjustments of the position of the weight 82 can be made to compensate for that wear and still achieve excellent cleaning. The closure force is correlated with the power consumption of the drive motor 22. When optimal cleaning occurs, the power consumption of the motor can be noted, for example in one embodiment 60 amperes of current is drawn. It has been found that optimal cleaning can be restored following a wear-induced degradation of cleaning by adjusting the weight to return to the power consumption of the motor when optimal cleaning takes place.

When the blades have been worn to the extent that effective cleaning cannot be accomplished, the machine can be serviced. The top 14 component can be removed from the bottom component 16 by separating them at the flanges seen in FIG. 6. This will make available the replaceable blades on the top 14 as well as the replaceable blades on the rotor. The blades can be replaced as discussed above, renewing the apparatus. With renewed blades, the weight position 82 can be restored to its least restrictive since the residence time required within the housing will be reduced by the replaced, more effective new blades.

This configuration has been found to be energy and water efficient, yet yield excellent cleaning results. The water needed is considerably reduced in comparison with prior art friction washers, for instance, in the range of 10% of prior water consumptions. It has been found that the water needed can be reduced to about 20 gallons of water to about 6000 pounds of plastic chips. The reduced water need reduces the contaminated-water cleanup costs. Moreover, the water used in the friction washer need not be heated, providing a considerable savings in energy costs.

Other forms of closing the plastic chip discharge port may be adopted, within the scope of the invention, including a spring resistance to opening, or solenoid, or hydraulic or pneumatic resistance, as long as the closure provides a resistance to opening, so that the pressure caused by the force on the chips and water within the housing can build to a threshold before the closure opens to release cleaned chips. Preferably, the threshold is adjustable to compensate for wear on the internal parts.

The system works well with HDPE plastic, but other polymer plastics can also be cleaned with the method and apparatus.

Since the housing is mounted substantially horizontally, the weight of the chips and water being processed at any particular part of the housing is born by the rotor or the bottom component 16 of the housing, directly below the chips and water. Thus, the pressure in the housing is correlated with the applied opposing forces of the drive screw 48 and the closure cup 76, allowing the pressure in the housing to be modulated as desired for optimum results. The housing may have some longitudinal tilt from perfect horizontality, as long as the pressure in the housing is susceptible to control by the opposing forces of the screw and the closure.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A friction washer for removing debris from plastic chips comprising:
   an elongated hollow housing having a rounded cross section mounted tilted or horizontally and having a top and a bottom, an in-feed port in an in-feed end of the top to connect to an in-feed conduit for supplying plastic chips and water into the housing, a plastic chip discharge port in a discharge end at the bottom of the housing, the plastic chip discharge port being a force-modulated discharge port held closed by a force to maintain the plastic chip discharge port closed until a plastic chip load within the housing overcomes the force to open the plastic chip discharge port, a debris discharge port covered with a mesh between the in-feed end and the discharge end to discharge water and debris removed from the plastic chips,
   a rotor mounted for rotation within the housing and having a series of blades extending outward from the rotor within the hollow housing,
   a screw flight at an in-feed end of the rotor,
   a motor driving the rotor and screw flight and a power supply to the motor,
   whereby the water and plastic chips are introduced into the in-feed end of the housing, moved toward the discharge end by the screw flight until encountering the rotor and the rotor blades, whereupon the plastic chips are agitated against one another, the water, the inside of the housing and the rotor and the rotor blades, so that debris is frictionally removed from the plastic chips as they pass from the in-feed end of the housing toward the discharge end, so the debris and water can pass through the mesh to exit the debris discharge port, and the plastic chips cleaned of debris can continue to the plastic chip discharge port, where, when a pressure within the housing is great enough to overcome the force on the plastic chip discharge port, the plastic chip discharge port opens to discharge cleaned plastic chips, and then recloses if the pressure within the housing falls enough to no longer overcome the force on the plastic chip discharge port.

2. The friction washer as claimed in claim 1 wherein the water and plastic chips are fed to the housing at a ratio of about 20 gallons of water to about 6000 pounds of plastic chips.

3. The friction washer as claimed in claim 1 including a water supply to the in-feed port that introduces unheated water.

4. The friction washer as claimed in claim 1 wherein the force-modulated discharge port has a counterweighted closure to maintain the plastic chip discharge port closed until a plastic chip load within the housing overcomes the counterweight to open the plastic chip discharge port.

5. The friction washer as claimed in claim 4 wherein the counterweighted closure includes a pivotally mounted lever with a closure plate on the lever on one side of a pivot mount and a weight on an opposite side of the pivot mount, the weight being adjustably positioned on the lever to allow adjustment of the force acting to maintain the plastic chip discharge port closed.

6. The friction washer as claimed in claim 1 wherein the blades on the rotor have staggered positions from one series of blades to an adjacent series.

7. The friction washer as claimed in claim 6 wherein the rotor has an axis and the blades are flat areas, and the flat areas of the blades are parallel with the axis of the rotor.

8. The friction washer as claimed in claim 6 wherein the rotor has blade mounts and the blades are replaceably mounted in the blade mounts.

9. The friction washer as claimed in claim 1 wherein the housing has a series of blades extending downward within the hollow housing from the top of the housing.

10. The friction washer as claimed in claim 1 wherein the motor is an electric motor and the power supply is an electric power supply that is controllable to supply 60 amps of current to the motor as the rotor turns in the range of 550-650 RPM.

11. A friction washer for removing debris from plastic chips comprising:
    an elongated hollow housing having a rounded cross section mounted tilted or horizontally and having a top and a bottom, an in-feed port in an in-feed end of the top to connect to an in-feed conduit for supplying plastic chips and unheated water into the housing, a plastic chip discharge port in a discharge end at the bottom of the housing, the plastic chip discharge port having a counterweighted closure that includes a pivotally mounted lever with a closure plate on the lever on one side of a pivot mount and a weight on an opposite side of the pivot mount, the weight being adjustably positioned on the lever to allow adjustment of a force acting to maintain the plastic chip discharge port closed until a plastic chip load within the housing overcomes the counterweight to open the plastic chip discharge port, a debris discharge port covered with a mesh between the in-feed end and the discharge end to discharge water and debris removed from the plastic chips, a rotor having an axis mounted for rotation within the housing and having a series of blades made up of blade mounts on the rotor and replaceable blades for the blade mounts extending outward from the rotor within the hollow housing, the blades on the rotor having staggered positions from one series of blades to an adjacent series and flat areas that are parallel with the axis of the rotor, the housing having a series of blades extending downward within the hollow housing from the top of the housing, a screw flight at an in-feed end of the rotor, an electric motor driving the rotor and screw flight and a power supply to the motor, the power supply being an electric power supply that is controllable to supply 60 amps of current to the motor as the rotor turns in the range of 550-650 RPM, whereby the water and plastic chips are introduced into the in-feed end of the housing at a ratio of about 20 gallons of water to about 6000 pounds of plastic chips, moved toward the discharge end by the screw flight until encountering the rotor and the rotor blades, whereupon the plastic chips are agitated against one another, the water, the inside of the housing and the rotor and the rotor blades, so that debris is frictionally removed from the plastic chips as they pass from the in-feed end of the housing toward the discharge end, so the debris and water can pass through the mesh to exit the debris discharge port, and the plastic chips cleaned of debris can continue to the plastic chip discharge port, where, when a pressure within the housing is great enough to overcome the force on the closure, the closure opens to discharge cleaned plastic chips, and then recloses if the pressure with within the housing falls enough to no longer overcome the force on the closure.

* * * * *